United States Patent [19]

Hilgen et al.

[11] 3,849,267

[45] Nov. 19, 1974

[54] PROCESS FOR RECOVERING MERCURY FROM A GAS CONTAINING MERCURY VAPOR

[75] Inventors: Hendrika Hilgen, Almelo; Casper J. N. Rekers, Hengelo, both of Netherlands

[73] Assignee: Akzo N.V., Arnhem, Netherlands

[22] Filed: Mar. 5, 1973

[21] Appl. No.: 338,193

[30] Foreign Application Priority Data

Mar. 6, 1972    Netherlands.................... 7202959

[52] U.S. Cl.................................. 204/99, 423/491
[51] Int. Cl...................... C01g 13/04, C01d 1/08
[58] Field of Search........ 423/491, 241, 99; 75/112; 204/94, 99

[56] References Cited
FOREIGN PATENTS OR APPLICATIONS
1,121,845    7/1968    Great Britain

OTHER PUBLICATIONS

Mellor, Comp. Treatise Inorganic & Theoret. Chem., Vol. 4, pp. 798–799, (1949).

Primary Examiner—Edward Stern
Attorney, Agent, or Firm—Clelle W. Upchurch

[57] ABSTRACT

A process for recovering mercury from a mercury-containing gas which includes mixing chlorine with the gas, then passing the mixture through a gas-permeable bed of a non-porous solid material which has a large surface area in relation to the bed volume to collect necessary chloride thereon and thereafter recovering the mercury by either washing the bed with chlorine containing brine and passing the resulting mercury-containing brine to an electrolysis cell with a mercury cathode or dissolving the bed material in an aqueous process stream and passing the stream to an electrolysis cell with a mercury cathode.

7 Claims, No Drawings

PROCESS FOR RECOVERING MERCURY FROM A GAS CONTAINING MERCURY VAPOR

The invention relates to a process for recovering mercury from a mercury containing gas by mixing the gas with chlorine and subsequently passing it through a medium which collects the mercury as a mercury chloride.

A method of the type indicated above is described in the Russian Journal Tsvetnye Metally 31, No. 12, 31-7 (1958) (See Chem. Abstr. 53 (1959) 7897).

The gas treated with chlorine is in that case scrubbed with water, after which the resulting aqueous solution is treated with magnesium hydroxide to precipitate mercuric oxide.

In the British Patent Specification No. 1,121,845 a process is described in which a gas stream containing mercury vapor is mixed with chlorine and subsequently washed with water or dilute acid in countercurrent or cocurrent fashion to obtain a mercuric chloride solution.

These known processes have the disadvantage that the washing treatment calls for a complex apparatus in which the washing liquid is to be pumped through a tower packed with inert material, while an appreciable pressure drop across the liquid-gas contacting zone is normally experienced. Moreover, in many cases the treated gas will have to be re-dried.

It also is known to remove mercury from gases by reactin/adsorption with halogen-containing active carbon having a large internal surface area. The mercury recovery therefrom and the regeneration of the porous carbon is very difficult.

The present invention provides a process of the type indicated in the opening paragraph which largely eliminates the aforementioned drawbacks.

The present invention consists in that for the collection of the mercury from the chlorine admixed gas use is made of a gas-permeable bed of a non-porous solid material presenting a total external surface area which is large in relation to the bed volume.

In this process any available internal surface area of the solid material is of no significance at all and should in fact be substantially absent in order to prevent regeneration problems.

According to the present invention it surprisingly has been found that even in the presence of an excess of chlorine mercurous chloride ($Hg_2Cl_2$) very readily accumulates on the external surface of a solid material while the exact nature of this surface does not play a particularly essential role therein.

In principle the form and the composition of the materials suitable to be employed in this process may vary widely. Use may be made of materials ranging from fibers or powders to coarse-grained particles, lumps or preformed bodies of organic or inorganic materials, either assemblied into a packed bed or, in the case of powders into a fluid bed. Whatever material is used the basic condition to be satisfied is that the solid material is substantially non-porous.

Mercurous chloride, unlike mercuric chloride has an extremely low vapor pressure.

The residual content of mercury obtainable in the treated gas is, of course, governed by the equilibrium vapor pressure of the mercurous chloride. At room temperature this corresponds to about 0.05 mg mercury/$m^3$ gas.

If under circumstances the residual mercury content should still be considered too high, it may be further reduced by passing the treated gas through a bed of activated carbon. It has been found that in this way the bed of activated carbon need be renewed only after very large amounts of gas have been passed through. The activated carbon bed also may serve to remove the preferably small excess of chlorine added initially. In this way the mercury content may be reduced to 0.01 mg/$m^3$.

It has been observed that on passing the chlorine admixed gas stream through, for instance, a glass tube mercurous chloride rather readily accumulates on the tube wall, which eventually may result in the passage being clogged up.

The present invention further provides a measure which eliminates this possible practical inconvenience. This measure consists in that the mercury containing gas stream is mixed with the chlorine immediately before or upon entering the gas-permeable bed.

The total volume of gas which according to the present invention may be effectively passed through a particular bed is determined by the amount of mercury chloride that may be stored in the bed before it is clogged. In this connection it is important to observe that a major part of the mercury in the gas tends to accumulate as calomel crystals in the first surface contacting zone of the bed. It is therefore preferred to use a bed in which the solid material is so arranged as to present an increase in available external surface area in the direction of the gas flow. To this end the most widely different types of packing bodies may be employed. For the initial contact with the gas stream use may be made, for example, of bodies with large openings such as Raschig rings or other usual types of column packing materials.

Further upstream the bed may very suitably contain, e.g., fine fibers, powders or grains, for example, glass wool or solid common salt.

Eventually the bed will become loaded with mercurous chloride crystals to such an extent that the increase in pressure drop across the bed becomes prohibitive for further operation, necessitating regeneration and/or refitting of the bed. The present invention also provides a process in which both the packing material and the mercury can be recovered. It consists in that the mercury chloride adsorbed on the packing material is freed therefrom by washing it with a brine which may or may not contain chlorine and passing the resulting mercury-containing brine to an electrolysis cell with a mercury cathode.

After this treatment the packing can immediately be re-used, although it should preferably be dried first. The mercury is collected by the cathode.

If the packing material consists of common salt, the recovery treatment may be effected by simply passing water through the salt bed and discharging the resulting mercury containing salt solution to an electrolysis cell with mercury cathode.

It will be clear that a salt bed may be used in combination with a glass wool column. For example, 90 percent of the mercury may first be removed with a salt bed and about 10 percent with the aid of glass wool.

Whenever a bed is used consisting wholly or partly of common salt it has in line with the above observed importance of the initially available surface area been found of particular advantage to at least use a bottom zone containing preformed bodies, such as cylinders or rings, of salt.

A number of variants of the process according to the present invention are illustrated in the following examples:

EXAMPLE I

To an air stream of 1000 liters per hour containing about 20 mg mercury per $m^3$ chlorine is fed through a capillary at a rate of 10 mg chlorine per $m^3$ of air.

The air stream is subsequently passed through a glass wool bed measuring 10 cm in diameter and 3 cm in height and containing 10 g of glass wool with a fiber diameter of 4 $\mu$.

It is found that the mercury content of the emerging gas stream has been reduced to as little as about 0.1 mg/$m^3$.

After a few days' continuous use, however, the glass wool bed begins to get noticeably clogged up on the side of the incoming air.

EXAMPLE II

An air stream containing mercury and mixed with chlorine as in Example I is passed through a cylindrical vessel 10 cm in diameter and filled with three superimposed layers of Raschig rings (made of PVC). Each layer is 4 cm high. The rings of the lowermost layer are 10 mm long, those of the middle layer are 7 mm long, and the ones of the uppermost layer are 4 mm long.

At first the mercury content of the air is reduced to about 4 mg per $m^3$, but gradually more mercury is absorbed and after a few weeks' continuous operation about 90–95 percent of the original content is being removed.

Apparently, the initially deposited mercury chloride favorably influences the subsequent absorption capacity of the bed.

If on top of the bed of rings there is additionally provided a layer of glass wool according to Example I, the mercury content is further reduced to as little as 0.05 mg per $m^3$. Even after two months' use such a bed still appears to be in excellent operating condition.

EXAMPLE III

An experiment is carried out on industrial scale involving an air stream flowing at 1000 $m^3$ per hour, containing 20 mg of mercury per $m^3$ and being fed with 10 mg of chlorine per $m^3$ of air. The air stream is subsequently passed to the bottom of a 1 m diameter column packed from the bottom upwards with:
1. a 20-cm thick layer of 50 mm diameter Raschig rings having a total volume of 200 liters;
2. a 10 kg layer of glass wool of 200 liter volume with a fiber diameter of 10 $\mu$;
3. a 4 kg layer of glass wool of 200 liter volume with a fiber diameter of 4 $\mu$.

After the air has passed through the column it contains as little as 0.1 to 0.2 mg of mercury per $m^3$. Only after two months continuous operation the average pressure drop of 5 cm hydrostatic head begins to increase noticeably.

The operation is then interrupted and the contents of the column are washed with a chlorine-containing brine, which is subsequently fed to an electrolysis cell with mercury cathode. After having been dried with hot air, the column packing can be put into operation again.

EXAMPLE IV

A glass cylindrical vessel 5 cm in diameter is filled from the bottom upwards with the following three layers of common salt:
1. a 7-cm thick layer of compressed salt granules 1.6 to 3 mm in diameter;
2. a 6-cm thick layer of compressed salt granules 1.2 to 1.6 mm in diameter;
3. an 18-cm thick layer of common vacuum salt.

An air stream containing 15 mg of mercury per $m^3$ is passed through the salt bed at a rate of 500 liters per hour; just before the air enters the bed it is mixed with chlorine up to a content of 14 mg of chlorine per $m^3$. As measured three hours after start-up the outflowing air only contains 0.8 mg of mercury per $m^3$.

Upon reducing the chlorine content to 4 mg of chlorine per $m^3$ the outflowing air is found to contain 1.7 mg of mercury per $m^3$ after a period of 5 hours.

EXAMPLE V

To a hydrogen stream of 3,600 $m^3$ per hour having a temperature of about 30°C. and a mercury content varying between 20 and 30 mg per $m^3$ chlorine is fed at a rate of 2 to 6 mg per $m^3$ air, which rate is controlled by spectrometric observation. The gas stream is subsequently passed through a 150 cm diameter column containing a gas permeable bed which in the direction of gas flow presents the following contacting zones.

The first contacting zone comprises a 30 cm thick layer of 2 inch ceramic Intalox saddles (product of US Stoneware Corp.), a 25 cm thick layer of 1 inch saddles and a 45 cm thick layer of one-half inch saddles.

The second contacting zone consists of a 5 cm thick layer of 4 $\mu$ glass wool fibers, while the final contacting zone is made up of a 50 cm thick layer of 2 mm granular activated carbon.

The pressure drop across the first two zones amounts to about 5 mm hydrostatic head and the hydrogen emerging from the second zone has a residual content of about 0.5 mg mercury per $m^3$.

This content is after passage through the carbon bed further reduced to less than 0.02 mg mercury per $m^3$. The pressure drop across the carbon bed amounts to about 60 mm hydrostatic head and the emerging hydrogen stream is virtually free of any chlorine.

EXAMPLE VI

An air stream of 1,200 $m^3$ per hour having a temperature of about 30°C. and containing about 30 mg mercury per $m^3$ is mixed with chlorine at a rate of about 8 mg chlorine per $m^3$ air.

The air is subsequently passed through a 1 m diameter column containing a 50 cm thick layer of preformed bodies of compressed common salt and a superimposed 10 cm thick layer of glass wool. The preformed salt bodies are in the shape of rings of 5 cm diameter, 2.5 cm thickness with a 2.5 cm center hole.

After passage through the bed the mercury content of the air is reduced to 0.2 mg per $m^3$.

While observing a very gradual increase in pressure drop across the bed the system remains easily operable even after nine months continuous operation.

In the process of this invention it it considered essential that the external surface of the solid material in the gas-permeable bed be large in relation to the bed volume in order to allow operation under practical conditions, particularly as to gas flow and bed size. Specifically the ratio of surface area to bed volume should be at least 20 m²/m³ and preferably more than 50 m²/m³.

As mentioned before even in the presence of an excess of chlorine the mercury chloride collected in the bed substantially consists of mercurous chloride (calomel). While a small amount of mercuric chloride may concurrently be formed this is of no practical consequence to the effectiveness of the mercury removal from the gas. In this context by the term substantially is meant a mercury chloride deposit containing at least 90 wt. percent, and usually more than 95 wt. percent, of mercurous chloride.

Since mercurous chloride has a very much lower vapor pressure than mercuric chloride it is precisely this unexpected predominant formation of mercurous chloride which accounts for the successful removal of mercury from gases in the process of this invention.

Naturally, the benefit of the low equilibrium vapor pressure of mercurous chloride is only adequately enjoyed in this process when the temperature of the gas to be treated is not too high.

Mercury polluted gases at about ambient temperature up to about 50° C would be the normal situation encountered in industry and such gases can be treated directly. However if at any point a mercury polluted gas happens to be at high temperature it is advisable to first cool the gas to at least 80° C, preferably to below 60° C, prior to subjecting it to the process of this invention.

What is claimed is:

1. A process for recovering mercury from a mercury-containing gas comprising mixing the gas with chlorine and subsequently passing the mixture at a temperature up to 80°C through a gas-permeable bed of non-porous solid material presenting a total external surface area amounting to at least 20 m² per m³ bed volume which collects the mercury as a mercury chloride.

2. The process according to claim 1 in which the bed at least partially consists of glass wool.

3. The process according to claim 1 in which the bed at least partially consists of preformed bodies of common salt.

4. The process according to claim 1, in which the material is so arranged in the bed as to present an increase in external surface area in the direction of the gas flow.

5. The process according to claim 1, including mixing the gas with chlorine immediately before or upon entering the bed.

6. The process according to claim 1, including washing the bed containing water-insoluble solid material after having become loaded with mercury chloride with a chlorine containing brine and passing the resulting mercury containing brine to an electrolysis cell with a mercury cathode.

7. The process according to claim 3, including dissolving the solid common salt content of the bed after having become loaded with mercury chloride in an aqueous process stream and passing the stream to an electrolysis cell with a mercury cathode.

* * * * *